US006601864B1

(12) United States Patent
Hoyt

(10) Patent No.: US 6,601,864 B1
(45) Date of Patent: Aug. 5, 2003

(54) DEVICE FOR PREVENTING A WHEELCHAIR OR A WALKER FROM PASSING THROUGH A DOORWAY

(76) Inventor: Ronald Hoyt, 91 Hope Rd., Plainfield, CT (US) 06374

( * ) Notice: Subject to any disclaimer, the term of this patent is extended or adjusted under 35 U.S.C. 154(b) by 0 days.

(21) Appl. No.: 09/434,883

(22) Filed: Nov. 5, 1999

(51) Int. Cl.[7] .................................................. B62H 9/00

(52) U.S. Cl. ................................ 280/304.1; 280/304.3; 280/304.5; 280/756; 297/118

(58) Field of Search ........................... 280/304.1, 304.3, 280/304.5, 756, 33.994, 288.4, 650, DIG. 3, DIG. 4; 297/118, 217.1, DIG. 4; 135/67

(56) References Cited

U.S. PATENT DOCUMENTS 3,272,527 A 9/1966 Martin ..................... 280/33.99
3,892,295 A 7/1975 Hahto ........................ 188/111
4,199,043 A 4/1980 Lankester et al. .......... 188/111
4,389,057 A * 6/1983 Richard, Jr. ................ 280/289
4,524,985 A 6/1985 Drake ................. 280/33.99 C
5,271,636 A 12/1993 Mohrman et al. ....... 280/304.1
5,551,105 A 9/1996 Short ........................... 5/87.1
5,653,392 A * 8/1997 Wells ......................... 239/722
D395,623 S * 6/1998 Yang ......................... D12/133
5,888,178 A * 3/1999 Welsh, Jr. .................... 482/66

FOREIGN PATENT DOCUMENTS

GB 2168018 A * 6/1986

* cited by examiner

*Primary Examiner*—Kenneth R. Rice
*Assistant Examiner*—Christopher Buchanan
(74) *Attorney, Agent, or Firm*—Cummings & Lockwood LLC

(57) ABSTRACT

A device for preventing a wheelchair or a walker from passing through a doorway, the doorway having a predetermined dimension, e.g., a predetermined height. The device includes a barrier and a coupling for securing the barrier to the; wheelchair or the walker such that a portion of the barrier extends from the wheelchair or the walker. The barrier has a primary dimension sized such that a combined dimension, e.g., a combined height, of the wheelchair or the walker and the portion of the barrier extending from the wheelchair or walker is greater than the predetermined height of the doorway, such that the barrier prevents the wheelchair or the walker from passing through the doorway. The present disclosure, therefore, provides a device for preventing a wheelchair or a walker from passing through a doorway to keep a patient in a defined area and prevent the patient from entering another area where the patient might be endangered or endanger others.

19 Claims, 5 Drawing Sheets

*FIG. 3*
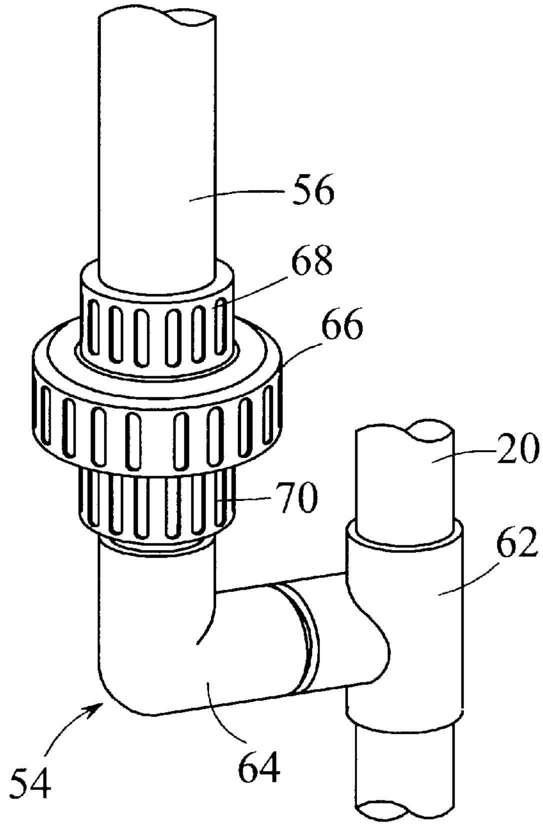
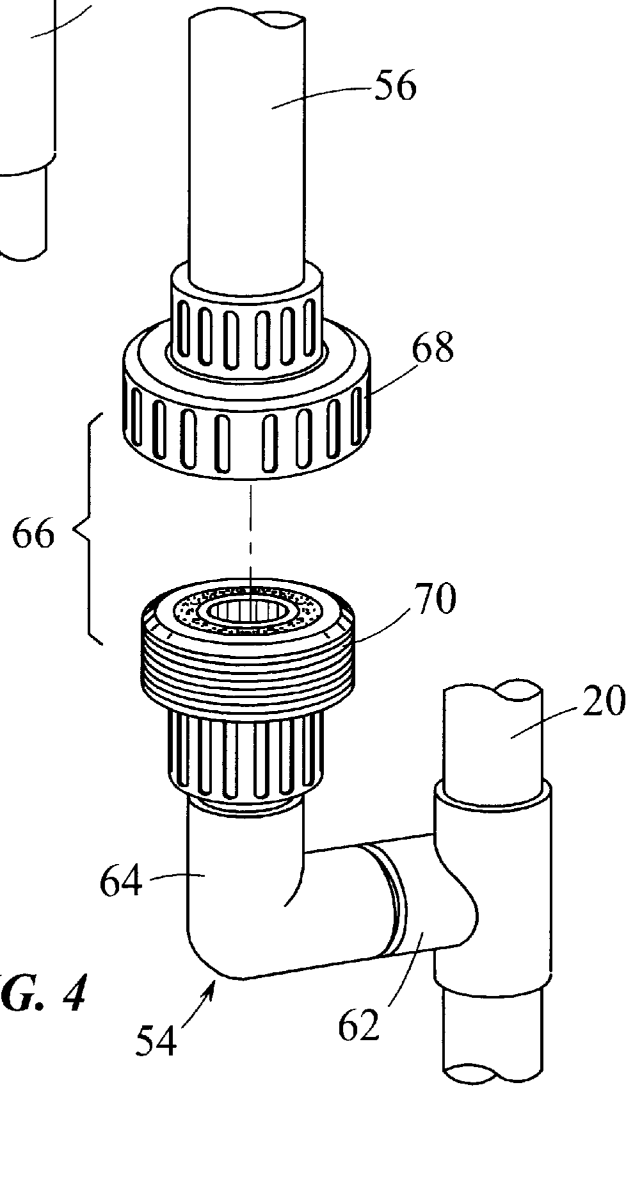
*FIG. 4*

DEVICE FOR PREVENTING A WHEELCHAIR OR A WALKER FROM PASSING THROUGH A DOORWAY

BACKGROUND OF THE DISCLOSURE

1. Field of the Disclosure

The present disclosure relates to a wheelchair or a walker and, more particularly, to a wheelchair or a walker including a device for limiting the travel of the wheelchair or the walker. Even more particularly, the present disclosure relates to a device that allows freedom of travel of a wheelchair or a walker in a defined area, yet prevents the wheelchair or the walker from leaving the defined area.

2. Description of Related Art

Wheelchairs and walkers and the like are used by patients in nursing homes, rehabilitation centers, hospitals, and even at home. Some of these patients, in addition to suffering from physical ailments, may also suffer memory impairment and moments of disorientation due to the affects of a stroke or Alzheimer's disease, for example. Such patients may not always be completely aware of their surroundings and, therefore, it is advantageous sometimes to be able to restrict their movement by limiting the travel of their wheelchair or walker.

U.S. Pat. No. 5,271,636 to Mohrman et al. shows a wheelchair travel restricting device which allows a patient to move a wheelchair, but restricts the distance the wheelchair may travel. The device includes first and second arms each having a generally U-shaped outer end adapter to engage a respective wheel of the wheelchair. The arms are connected together so that the device is held on the wheels, free of any fixed connection to the wheelchair. The device, as held on the wheels, stops travel of the wheelchair by hitting against the frame upon rotation of the wheels in a first direction and hitting against the floor upon rotation of the wheels in a second direction. The device shown, therefore, limits the travel of a wheelchair to a relatively short distance, i.e., less than a single rotation of the wheels.

Accordingly, there is still a need for a device for restricting the travel of a wheelchair or walker, yet that allows a patient some measure of freedom of movement in a clearly defined area. In particular, there is a need for a device for preventing a wheelchair or walker from leaving a defined area, but that allows freedom of travel of the wheelchair or the walker in the defined area.

SUMMARY OF THE DISCLOSURE

The present disclosure, therefore, provides a device for preventing a wheelchair or a walker from passing through a doorway having a predetermined dimension, e.g., a predetermined height. The device includes a barrier and a coupling for securing the barrier to the wheelchair or the walker such that a portion of the barrier extends from the wheelchair or the walker. The barrier has a primary dimension sized such that a combined dimension, e.g., a combined height, of the wheelchair or the walker and the portion of the barrier extending from the wheelchair or walker is greater than the predetermined height of the doorway, such that the barrier prevents the wheelchair or the walker from passing through the doorway. The present disclosure, therefore, provides a device for preventing a wheelchair or a walker from passing through a doorway to keep a patient in a defined area and prevent the patient from entering another area where the patient might be endangered or endanger others.

BRIEF DESCRIPTION OF THE DRAWINGS

FIG. 3 is an enlarged front/side isometric view of a portion of the wheelchair contained in circle 3 of FIG. 2;

FIG. 4 is an exploded front/side isometric view of the portion of the wheelchair shown in FIG. 3;

DETAILED DESCRIPTION OF THE DISCLOSURE

Figure 1:
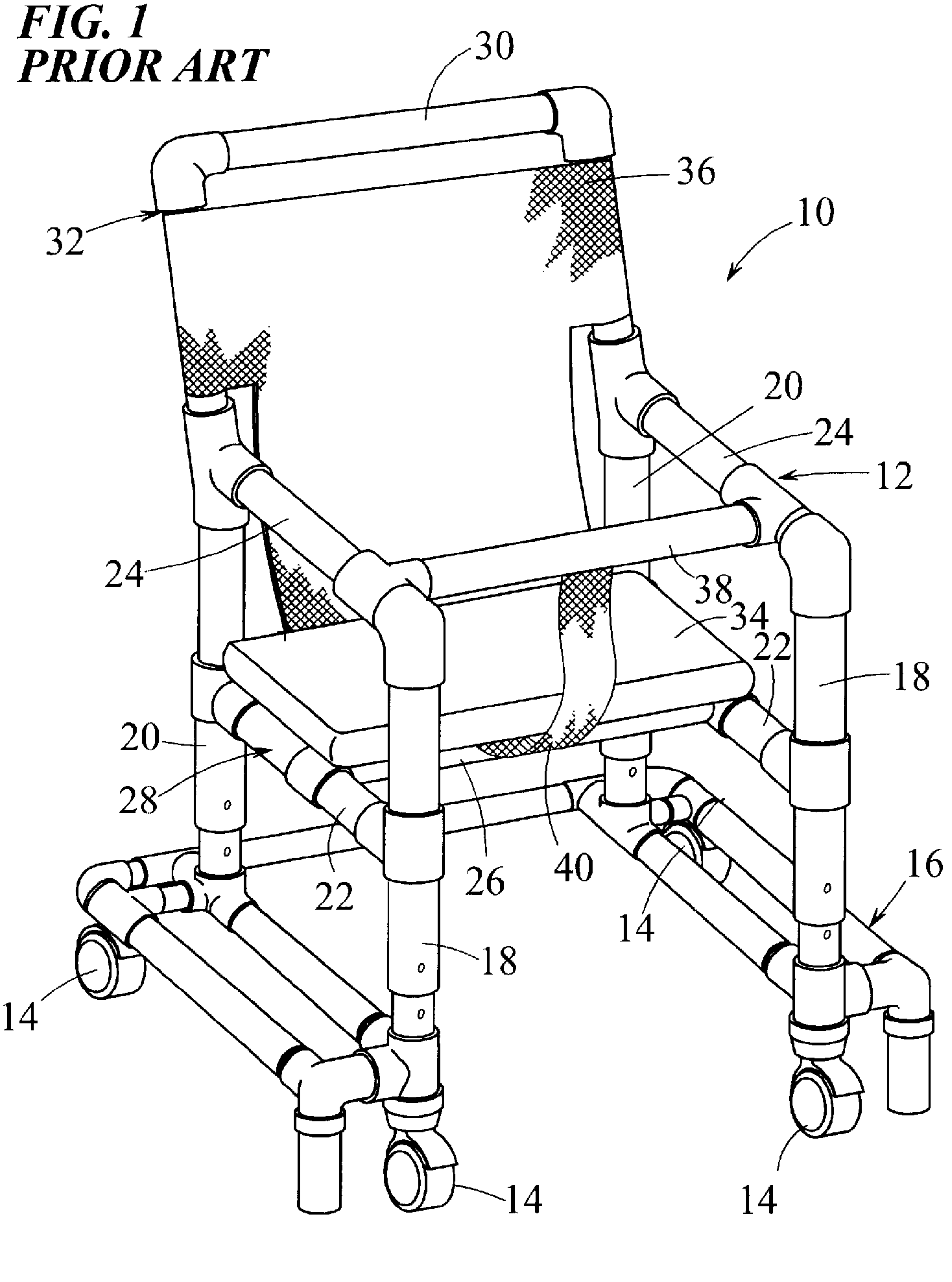
FIG. 1 PRIOR ART
FIG. 1 is a front/side isometric view of an existing wheelchair.

Referring to FIG. 1, a commercially available wheelchair 10 is shown. The wheelchair 10, which is available from Innovative Products Unlimited, Inc., of Appleton, Wis., under the trademark "The Ultimate Walker", is a wheelchair that can also be used by a patient as a walker.

The wheelchair 10 includes a frame 12 made of polyvinylchloride ("PVC") tubing and miscellaneous PVC connectors. The frame 12 is mounted on four caster wheels 14 for mobility. The frame 12 generally includes a base 16 connected to the four wheels 14, and two front vertical members 18 and two rear vertical members 20 extending upwardly from the base. The vertical members 18, 20 are telescoping such that their height can be adjusted. Two lower horizontal members 22 and two upper horizontal members 24 connect the front and the rear vertical members 18, 20. A first cross member 26 connects the lower horizontal members to form a seat portion 28 of the frame 12, while a second cross member 30 connects the rear vertical members 20 to form a back portion 32 of the frame.

As shown, a seat cushion 34 is mounted on the seat portion 28 of the frame 12, while a backrest 36 is mounted to the back portion 32 of the frame. In addition, the frame 12 is provided with a removable crossbar 38 that extends between the two upper horizontal members 24, and a strap 40 that extends between the seat portion 28 of the frame and the crossbar.

Figure 2:
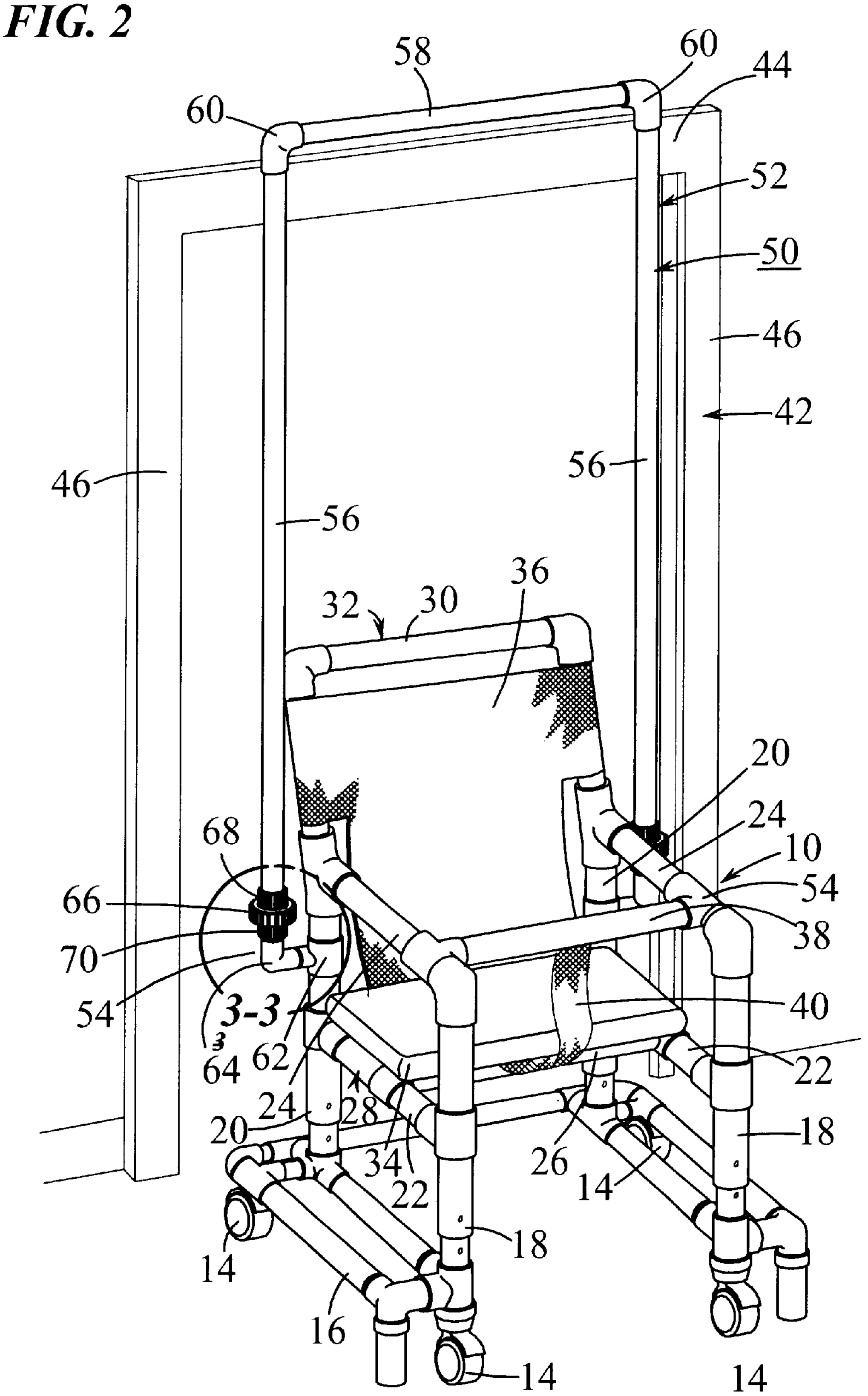
FIG. 2 is a front/side isometric view of a wheelchair similar to the wheelchair of FIG. 1, but including a device according to the present disclosure for preventing the wheelchair from passing through a doorway, as shown.

Referring now to FIG. 2, the wheelchair 10 of FIG. 1 is shown with a device 50 according to the present disclosure which prevents the wheelchair from passing through a doorway 42. The device 50 is for use in nursing homes, rehabilitation centers, hospitals, and even at home, where a patient using the wheelchair may not always be completely aware of their surroundings because of memory impairment and/or moments of disorientation, due to the affects of a stroke or Alzheimer's disease, for example. The device 50 allows patients who use the wheelchair 10 some independence in the sense that the patient does not have to be constantly monitored by a caregiver and that the patient can freely move throughout the defined area, i.e., a room having the doorway 42. Yet the device 50 prevents the wheelchair 10 and patient from leaving the defined area through the doorway 42 and entering another area connected by the doorway, where the patient might be endangered or endanger others.

It should be understood that while the device 50 according to the present disclosure is shown being used with a particular type of wheelchair 10, i.e., "The Ultimate Walker", the device is not limited to use with this particular wheelchair. It is intended that the device 50 disclosed herein can be used and, if necessary, can be modified for use with other types of wheelchairs. In addition, it is intended that the device 50 disclosed herein can be used with a walker to restrict the travel of the walker. Furthermore, it is intended that the device 50 can be used with other types of aids, such as a walker for an infant for example.

Referring to FIG. 2, the device 50 includes a barrier 52, and two couplings 54 securing the barrier to the wheelchair 10 such that a portion of the barrier 52 extends from the wheelchair. The barrier 52 has a primary dimension sized such that a combined dimension of the wheelchair 10 and the portion of the barrier extending from the wheelchair is greater than a predetermined dimension of the doorway 42, such that the barrier prevents the wheelchair from passing through the doorway.

As is shown in FIG. 2, the predetermined dimension of the doorway 42 is the height of the doorway, while the primary dimension of the barrier 52 is the height of the barrier, so that the combined height of the portion of the barrier extending from the wheelchair and the wheelchair are greater than the height of the doorway. Accordingly, the barrier 52 will bump against a top portion 44 of the doorway 42 to prevent the wheelchair 10 from passing therethrough.

The barrier 52 includes two vertical PVC tube members 56, and a horizontal PVC tube member 58 connected between top ends of the PVC tubes with PVC elbows 60. (A preferred method of securing the different PVC members together is with a suitable glue.)

While a particular barrier 52 has been specifically disclosed, it should be understood that the barrier shown is meant to be illustrative and not limiting. For example, the barrier may alternatively be secured to a wheelchair or a walker 10 so that the barrier extends from one or both sides of the wheelchair or walker, and bumps against one or both side portions 46 of the doorway 42 to prevent the wheelchair or walker from passing therethrough. Or, the barrier may be formed such that it extends upwardly from the wheelchair or walker 10 and then extends outwardly to the sides (i.e., a "T" shaped barrier) so that the barrier bumps against one or both side portions 46 of the doorway 42, nearer to the top portion 44 of the doorway. In addition, the barrier is not to be considered limited to a PVC construction, as other materials and types of members can be used. In sum, many variations of the barrier are possible without departing from the spirit and scope of the device 50 as disclosed and claimed herein.

Referring now to FIGS. 2 through 4, the couplings 54 of the device 50 can be permanently secured to the frame 12 of the wheelchair 10 with PVC tee fittings 62. In particular, the rear vertical frame members 20 are cut between the lower and the upper horizontal frame members 22,24, and the tee fittings 62 are secured therebetween. Each coupling 54 also includes a PVC elbow 64 extending from the tee fitting 62.

The barrier 52 is removably secured to the couplings 54 with threaded connectors 66. The threaded connectors 66 include female halves 68 connected to bottom ends of the vertical tube members 56 of the barrier 52, and male halves 70 connected to the elbows 64 of the couplings 54.

Figure 5:
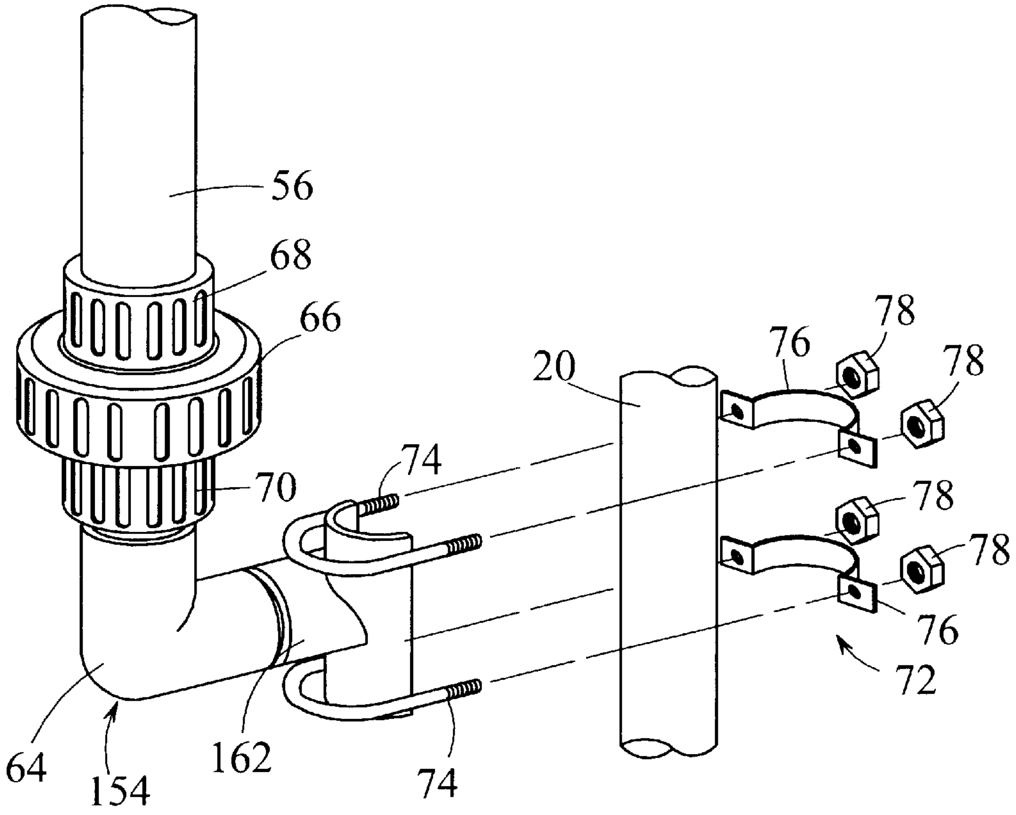
FIG. 5 is an exploded front/side isometric view, similar to FIG. 3, of a portion of another device according to the present disclosure for preventing a wheelchair from passing through a doorway.

Referring to FIG. 5, the device 50 can be provided with couplings 154 that are permanently secured to the frame 12 of the wheelchair 10, but without having to cut through any piece of the frame. The couplings 154 are similar to the couplings 54 of FIGS. 2 through 4, except that their tee fittings 162 are cut in half, such that they can be placed closely against the rear vertical frame members 20. The couplings 154 are then held in place in a somewhat permanent manner with two U-bolt assemblies 72, which are secured around the cut tee fittings 162 and the rear vertical members 20. The U-bolt assemblies 72 include threaded U-bolts 74, braces 76, and threaded nuts 78, as shown.

Figure 6:
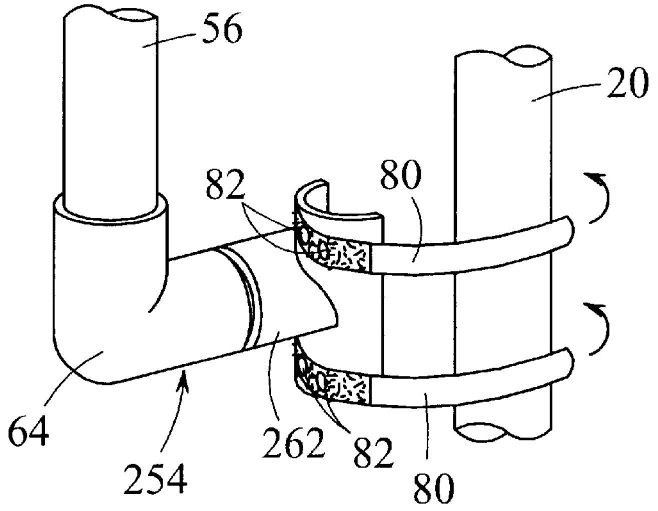
FIG. 6 is an exploded front/side isometric view, similar to FIG. 3, of a portion of an additional device according to the present disclosure for preventing a wheelchair from passing through a doorway.

Referring to FIG. 6, the device 50 can be provided with couplings 254 that are permanently secured to the barrier 52 and removably secured to the frame 12 of the wheelchair 10. The couplings 254 are similar to the coupling of FIG. 5, except that their tee fittings 262, which are cut in half, are held in place against the rear vertical members 20 of the wheelchair frame 12 with hook and loop ("VELCRO") fasteners 80. The hook and loop fasteners 80 are secured to the cut tee fitting 262 with rivets 82, for example. As shown, the device 50 does not include threaded connectors between the barrier 52 and the couplings 254. Instead, the barrier 52 is permanently connected directly to the couplings 254 by the bottoms of the vertical members 56 of the barrier being secured to the elbows 64 of the couplings 254.

While particular means for coupling the device 50 to a wheelchair or walker 10 have been specifically disclosed, it should be understood that the means shown are meant to be illustrative and not limiting. Many other means can be used to secure the barrier 52 to a wheelchair or walker 10 without departing from the spirit and scope of the present device 50 as disclosed and claimed herein.

Figure 7:
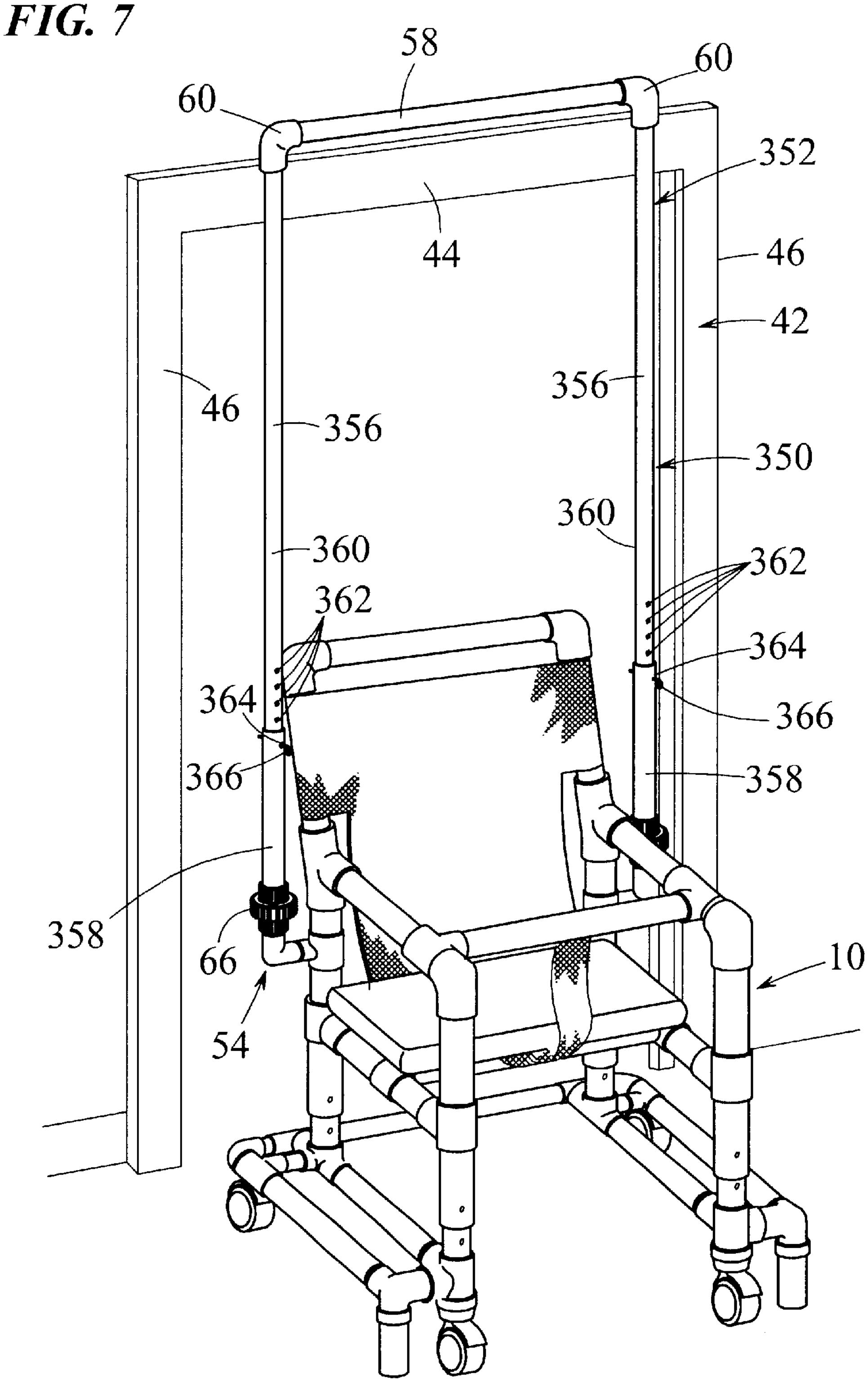
FIG. 7 is a front/side isometric view of a wheelchair similar to the wheelchair of FIG. 1, but including a further device according to the present disclosure for preventing the wheelchair from passing through a doorway, as shown.

Referring now to FIG. 7, a device 350 according to the present disclosure can also be provided with a barrier 352 having an adjustable primary dimension or, in the particular embodiment shown, an adjustable height. The device 350 and the wheelchair 10 of FIG. 7 are similar to the device 50 and the wheelchair 10 of FIGS. 2 through 4, and elements that are the same have the same reference numerals. The device 350 of FIG. 7 is provided with a barrier 352 having telescoping vertical members 356. Each vertical member 356 includes a lower tube 358 extending from the threaded connector 66 and an upper tube 360 slidingly received in the lower tube 358. As shown the upper tubes 360 included a plurality of vertically spaced holes 362 that can each be aligned with a hole 364 of the lower tube 358. The upper tubes 360 can be adjusted with respect to the lower tubes 358 until preferred holes 362 of the upper tubes align with the holes 364 of the lower tubes. The upper tubes 360 can then be secured in place within the lower tubes 358 by inserting removable pins 366 through the aligned holes 362, 364 of the upper and the lower tubes. The telescoping vertical members 356, therefore, provide the barrier 352 with an adjustable height.

Accordingly, the present disclosure provides devices 50, 350 for preventing a wheelchair or a walker 10 from passing through a doorway 42 to keep a patient in a defined area and prevent the patient from entering another area where the patient might be endangered or endanger others. While particular embodiments of a device 50, 350 according to the present disclosure have been shown, it should be understood that these embodiments are meant to be illustrative and not limiting. Many variations of the device 50, 350 are possible without departing from the spirit and scope of the device 50, 350 as disclosed above and claimed below.

What is claimed is:

1. A device for preventing at least one of a wheelchair and a walker from passing through a doorway, the doorway having a predetermined height, the device comprising:

a barrier for allowing freedom of travel of the wheelchair or walker within a defined area while preventing the wheelchair or walker from passing through the doorway;

at least one coupling for securing the barrier to the wheelchair or walker such that a portion of the barrier extends outwardly from the wheelchair or walker; and wherein the barrier, when attached to the wheelchair or walker, defines a height greater than the corresponding height of the doorway to thereby prevent the wheelchair or walker from passing through the doorway, wherein the height of the barrier is adjustable.

2. A device according to claim 1 wherein the barrier is removably secured to the coupling.

3. A device according to claim 1 wherein the barrier is permanently secured to the coupling.

4. A device according to claim 1 wherein the coupling is removably securable to the wheelchair or walker.

5. A device according to claim 1 wherein the coupling is permanently securable to the wheelchair or walker.

6. A wheelchair including the device of claim 1 for preventing the wheelchair from passing through a doorway having a predetermined dimension comprising:

a frame supporting a seat and a seat back; and wheels secured to the frame for providing mobility to the wheelchair;

with the at least one coupling of the device of claim 1 secured to the frame of the wheel chair, and the barrier secured to the at least one coupling such that a portion of the barrier extends from the wheelchair.

7. A walker including the device of claim 1 comprising:

a frame for supporting a standing patient; and wheels secured to the frame for providing mobility to the walker;

with the at least one coupling of the device of claim 1 secured to the frame of the walker, and the barrier secured to the at least one coupling such that a portion of the barrier extends from the walker to prevent the walker from passing through a doorway.

8. A device for preventing at least one of a wheelchair and a walker from passing through a doorway, wherein the wheelchair and the walker includes a frame and the doorway defines a first predetermined width and a first predetermined height, and the frame defines an attachment point for attaching thereto the device, the device comprising:

an upwardly-extending barrier, and at least one coupling for securing the barrier to the attachment point on the frame such that the barrier extends upwardly from the frame, wherein the barrier defines a second predetermined width and a second predetermined height upon attachment by the at least one coupling to the attachment point of the frame, and at least one of the second predetermined height and the second predetermined width of the device is greater than the first predetermined height and the first predetermined width, respectively, of the doorway, to thereby prevent the barrier and frame attached thereto from passing through the doorway, wherein the barrier defines two axially-elongated upwardly-extending members laterally spaced relative to each other, and a-lateral member extending-between and coupled to the upwardly-extending members.

9. A device as defined in claim 8, comprising two couplings, each coupling being connectable between a respective upwardly-extending member and the frame.

10. A device as defined in claim 9, wherein each of the upwardly-extending members and the lateral member are approximately tubular in shape.

11. A device as defined in claim 9, further comprising two pairs of upwardly-extending members, wherein each pair includes a first upwardly-extending member telescopically mounted within a second upwardly-extending member for adjusting the height of the barrier to accommodate doorways of different heights.

12. A device for preventing at least one of a wheelchair and a walker from passing through a doorway, wherein the wheelchair and the walker includes a frame and the doorway defines a first predetermined height, and the frame defines an attachment point for attaching thereto the device, the device comprising:

first means extending upwardly from the frame and defining a second predetermined height upon attachment to the attachment point of the frame greater than the first predetermined height of the doorway, for contacting the doorway upon movement of the frame therein and preventing passage of the frame through the doorway; and second means for securing the first means to the frame.

13. A device as defined in claim 12, wherein the first means includes at least one upwardly-extending member.

14. A device as defined in claim 13, wherein the at least one upwardly-extending member includes two axially-elongated upwardly-extending members laterally spaced relative to each other, and a lateral member extending between and coupled to the upwardly-extending members.

15. A device as defined in claim 12, further comprising third means for adjusting the height of the first means to accommodate doorways of different heights.

16. A device as defined in claim 15, wherein the first means includes at least two upwardly-extending members, and the third means includes a telescopic connection formed between the upwardly-extending members to thereby allow at least one member to be moved relative to the other to thereby adjust the height of the members.

17. A method for preventing at least one of a wheelchair and a walker from passing through a doorway, wherein the wheelchair and the walker includes a frame, the frame defines an attachment point thereon, and the doorway defines a first predetermined width and a first predetermined height, the method comprising the steps of:

attaching an upwardly-extending barrier to the frame at the attachment point of the frame such that the barrier defines a second predetermined width and a second predetermined height upon attachment to the frame;

setting at least one of the second predetermined width and the second predetermined height of the barrier greater than the first predetermined width and the first predetermined height, respectively, of the doorway; and contacting the doorway with the barrier upon movement of the frame therein and preventing passage of the frame through the doorway.

18. A method as defined in claim 17, wherein the setting step includes setting the second predetermined height of the barrier greater than the first predetermined height of the doorway, and the contacting step includes contacting an upper portion of the doorway with an upper portion of the barrier.

19. A method as defined in claim 17, further comprising the step of adjusting the second predetermined height of the barrier to accommodate doorways of different heights.

* * * * *